United States Patent
Penet

(10) Patent No.: US 7,843,971 B2
(45) Date of Patent: Nov. 30, 2010

(54) MODULAR EXPANDABLE TELECOMMUNICATION SYSTEM

(75) Inventor: Xavier Penet, Illkirch Graffenstaden (FR)

(73) Assignee: NVIDIA International, Inc., St. Michael (BB)

( * ) Notice: Subject to any disclaimer, the term of this patent is extended or adjusted under 35 U.S.C. 154(b) by 2367 days.

(21) Appl. No.: 09/968,915

(22) Filed: Oct. 3, 2001

(65) Prior Publication Data

US 2002/0044571 A1     Apr. 18, 2002

(30) Foreign Application Priority Data

Oct. 13, 2000   (EP)   .................. 00440276

(51) Int. Cl.
   *H04J 3/06*   (2006.01)
(52) U.S. Cl. .................. 370/503; 370/360
(58) Field of Classification Search .......... 370/362, 370/363, 364, 365, 384, 438, 458, 503, 506, 370/507, 522; 379/142.01, 142.12, 156, 379/165, 198, 325, 326, 327, 328, 329, 330, 379/413.04

See application file for complete search history.

(56) References Cited

U.S. PATENT DOCUMENTS

| | | | | |
|---|---|---|---|---|
| 4,339,633 A | * | 7/1982 | Ahmed | 370/363 |
| 4,723,272 A | * | 2/1988 | Maat | 379/211.01 |
| 4,887,076 A | * | 12/1989 | Kent et al. | 340/3.43 |
| 5,539,817 A | | 7/1996 | Wilkes | |
| 5,801,921 A | * | 9/1998 | Miller | 361/679.32 |
| 6,333,940 B1 | * | 12/2001 | Baydar et al. | 370/506 |
| 6,366,656 B1 | * | 4/2002 | Lee et al. | 379/198 |
| 6,748,473 B1 | * | 6/2004 | Shatas et al. | 710/300 |
| 6,751,198 B1 | * | 6/2004 | McPherson et al. | 370/252 |
| 6,795,448 B1 | * | 9/2004 | Lee et al. | 370/419 |
| 7,058,826 B2 | * | 6/2006 | Fung | 713/300 |
| 7,134,011 B2 | * | 11/2006 | Fung | 713/100 |

FOREIGN PATENT DOCUMENTS

| | | |
|---|---|---|
| EP | 0 006 133 A1 | 1/1980 |
| IE | 68 843 B | 7/1996 |

* cited by examiner

Primary Examiner—Michael J Moore, Jr.
(74) Attorney, Agent, or Firm—Zilka-Kotab, PC

(57) ABSTRACT

A modular expandable telecommunication system having a main cabinet and at least one expansion cabinet that are interconnected with each other to obtain an extended telecommunication system with increased connection possibilities for extensions and trunks. The main cabinet and each expansion cabinet have a transmission interface unit allowing connection of the expansion cabinet(s) to the main cabinet via a single transmission link conveying voice/data channels and low level signaling for mutual synchronization and clock recovery for all interconnected cabinets. The main cabinet has a master clock device, a CPU for running software applications and a DSP for routing the higher level messages issued by the CPU depending on the physical location of the expansion cabinet.

16 Claims, 7 Drawing Sheets

| SYNCHRO | MAINTENANCE | SIGNALLING | Nx64kbit/s CHANNELS |

MODULAR EXPANDABLE TELECOMMUNICATION SYSTEM

TECHNICAL FIELD

The present invention relates generally to telecommunication systems, more particularly interconnecting and transmission systems or devices, and concerns a modular expandable telecommunication system. The invention is based on a priority application EP 00 44 0276 which is hereby incorporated by reference.

BACKGROUND OF THE INVENTION

In some widespread and size evolving organizations, like a campus, it is necessary to structure the telecommunication system in a modular way and to maintain the different remote modules of that system functionally interconnected.

Furthermore, everything has to stay transparent for the system manager and the installer, as well as the end users, with no difference for interfaces of main and satellite modules, and the same level of features and performances should be provided by all of the modules or cabinets forming the system.

The easiness to spread the different cabinets or modules on the campus, by taking these conditions into account, is an important factor for the end price of the chosen solution and the search for a seamless (transparent) installation and operation (with no distinction) between the main and the secondary modules seems to be the most promising approach.

The above-mentioned technical problem appears in the design of private automatic branch exchanges (PABX), as well as when connecting wireless base stations (for example wireless systems using DECT technology).

It is known, from prior art, to use several types of links, and corresponding specific interfaces, to perform full connection between the various modules, i.e., a specific link for voice/data transmission, another one for signaling, another one for synchronization and still another one for resetting purposes, which requires many cables to realize the connections.

It is also known to combine some of the previous links in order to reduce the number of connecting wires, but no global solution exists.

Thus, a digital tie line for voice/data and signaling has been proposed. However, such a line implies the use of a network protocol and, consequently, a distinction will be made between the subscribers connected to the different modules.

SUMMARY OF THE INVENTION

An aspect of the present invention is to overcome at least some of the aforesaid drawbacks and limitations.

Therefore, the present invention mainly concerns a modular expandable telecommunication system, such as a private automatic branch exchange system (PABX), comprising a main or primary cabinet and at least one expansion or secondary cabinet, remote located or not, which are interconnected with each other in order to obtain an extended telecommunication system with increased connection possibilities for extensions and trunks, wherein the main cabinet and each of the expansion cabinet comprise a transmission interface unit allowing connection of the said expansion cabinet(s) with said main cabinet via a single transmission link conveying voice/data channels and low level or local signaling for performing at least mutual synchronization and clock recovery for all interconnected cabinets, the main cabinet comprising in particular a master clock device, a CPU (control processing unit) for running the application and a DSP (digital signal processor) for routing the higher level messages issued by the CPU depending on the physical location of the destination cabinet.

BRIEF DESCRIPTION OF THE DRAWINGS

The present invention will be better understood thanks to the following description and drawings of an embodiment of said invention given as a non-limiting example thereof, in which.

DETAILED DESCRIPTION OF THE INVENTION

Figure 1:
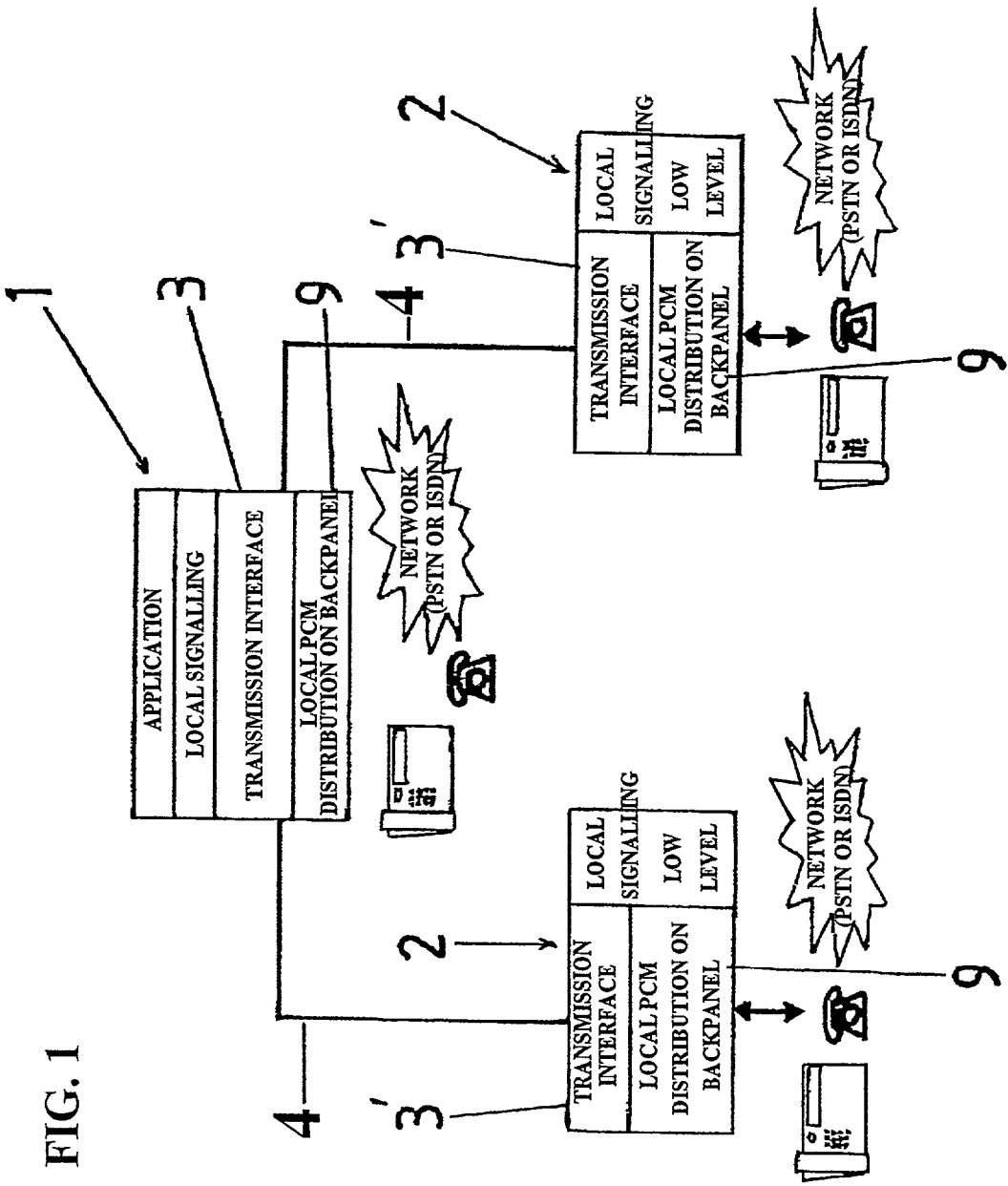
FIG. 1 is a schematic representation in the form of a block diagram of a system according to the invention comprising of one main cabinet or module connected with two expansion cabinets or modules.

Shown on the enclosed figures is a modular expandable telecommunication system, such as a private automatic branch exchange system (PABX), comprising a main or primary cabinet or module 1 and at least one expansion or secondary cabinet or module 2, remote located or not, which are interconnected with each other in order to obtain an extended telecommunication system with increased connection possibilities for extensions and trunks.

According to the invention, the main cabinet 1 and each of the expansion cabinet 2 comprise a transmission interface unit 3, 3' allowing connection of the said expansion cabinet(s) 2 with said main cabinet 1 via a single transmission link 4 conveying voice/data channels and low level signaling for performing at least mutual synchronization and clock recovery for all interconnected cabinets 1 and 2, the main cabinet 1 comprising in particular a master clock device 5, a CPU 6 for running the application and a DSP 7 for routing the higher level messages issued by the CPU 6 depending on the physical location of the destination cabinet 2.

Thus, low level signaling is associated to the control channel of each expansion cabinet 2 in order to handle all external connection interfaces (extensions and trunks) in the same way irrespective of their location (main or expansion cabinet). The whole application is running in the main cabinet 1 only to hide the physical position (genuine "plug and phone" solution), whereas initialization and low level signaling are distributed on each cabinet 1 and 2 (no restriction for users of expansion cabinets).

Figure 2:
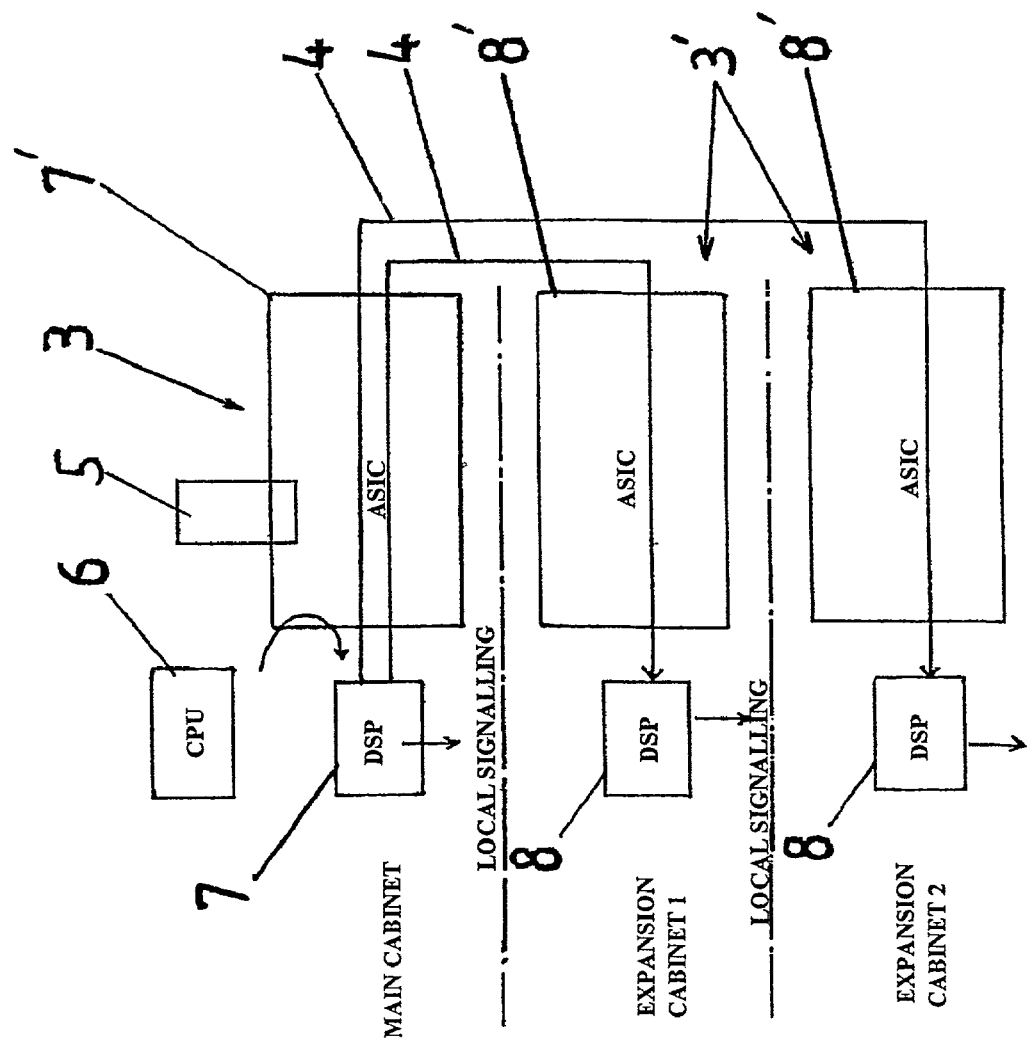
FIG. 2 is a schematic representation in the form of a block diagram showing the functional interconnection of the transmission interface units of the system of FIG. 1.

Indeed, as can be seen on FIG. 2, the telecommunication system is driven by a single CPU 6. The basic software, as well as the concerned application software, is loaded in the main cabinet 1, and only the basic input/output system is loaded in the expansion cabinet(s) 2.

Among the possible applications that can be implemented by the telecommunication system according to the invention, one could mention for example call handling, voice mail, voice over Internet (VoIP) and basic or complete internet access, depending in particular on the services required by the users and on the CPU performance.

Figure 5:
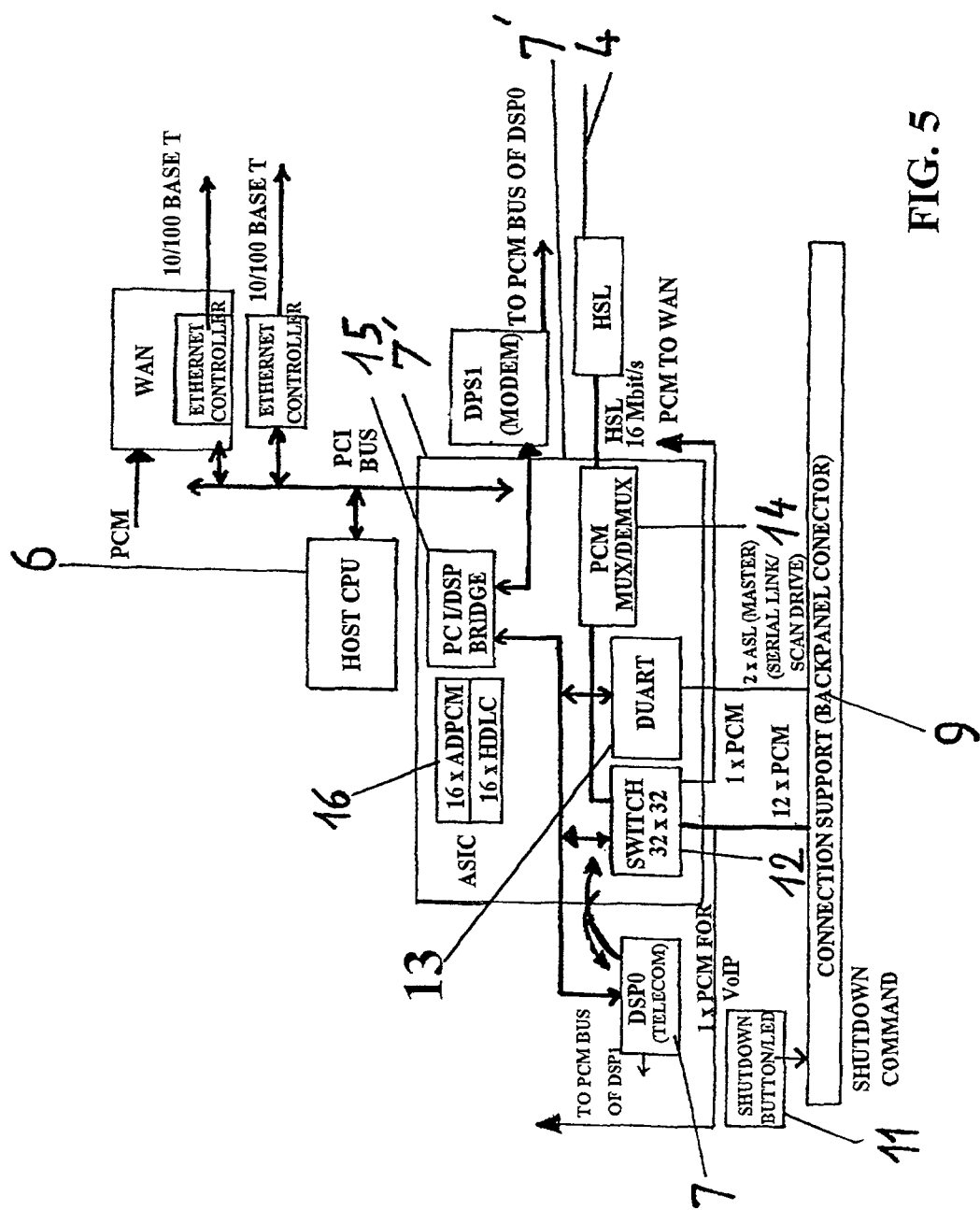
FIG. 5 is a schematic representation in the form of a block diagram showing the main functional components of the main cabinet.
Figure 6:
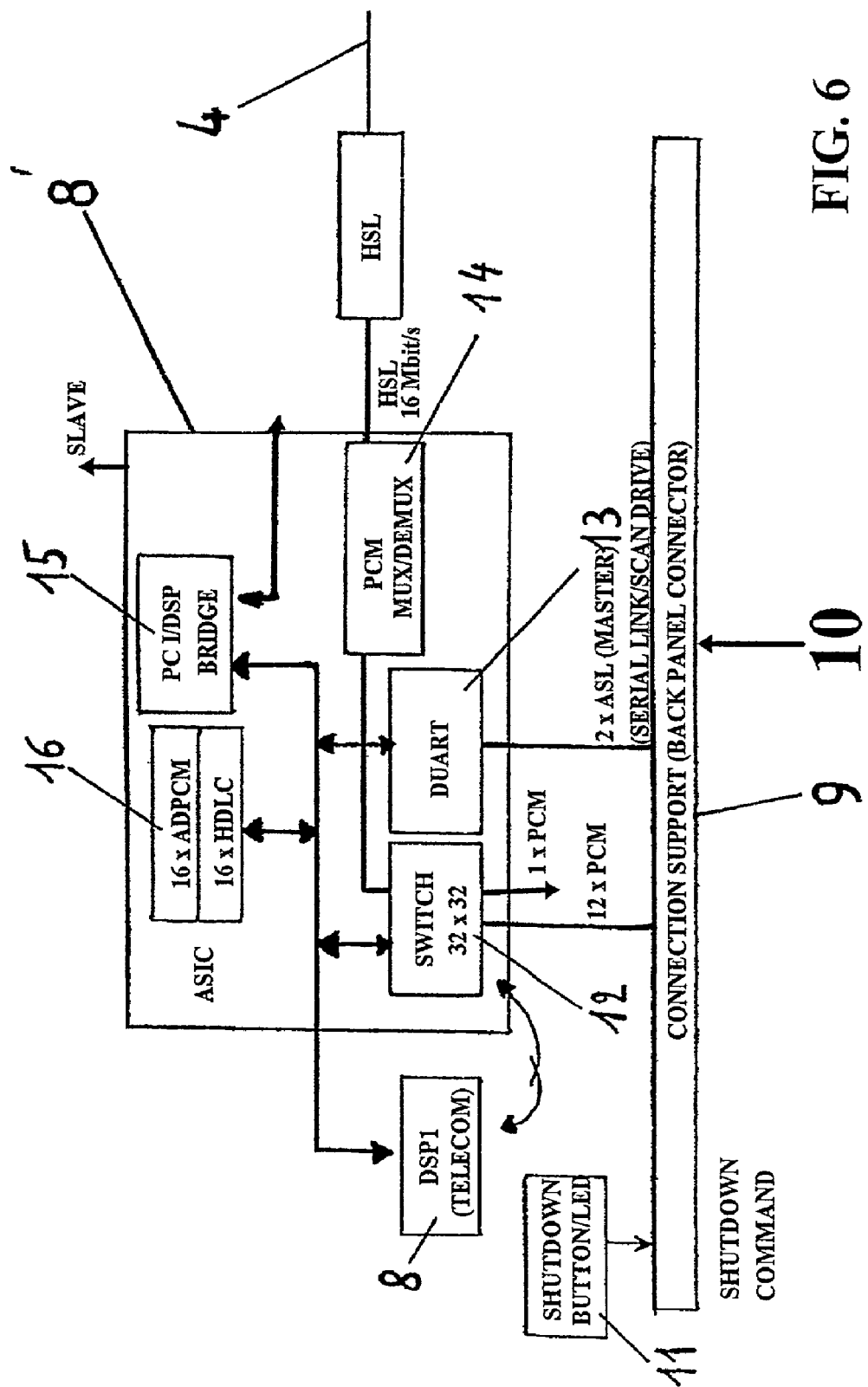
FIG. 6 is a schematic representation in the form of a block diagram showing the main functional components of the expansion cabinet.

As shown on FIGS. 2, 5 and 6, each transmission interface unit 3, 3' comprises an ASIC 7', 8' associated with a corresponding DSP 7, 8, the DSP 7 of the main cabinet 1 controlling the switching of all connections of all cabinets 1 and 2.

According to the invention, each interface unit 3, 3' is adapted for connection through a transmission link 4 comprising a high speed link implemented on 2 pairs and using PCM (Pulse code modulation) multiplex for voice/data transmission.

Preferably, each transmission interface unit 3, 3' comprises means providing synchronization with clock recovery and frame adjustment, control channel of the corresponding expansion cabinet 2, remote resetting and software downloading of the said expansion cabinet 2, support for external interfacing and connecting means for short or long haul transmission (HSL board on FIGS. 5 and 6, also comprising the physical drivers for the transmission link 4) and line coding and/or scrambling.

Figures 3, 4:
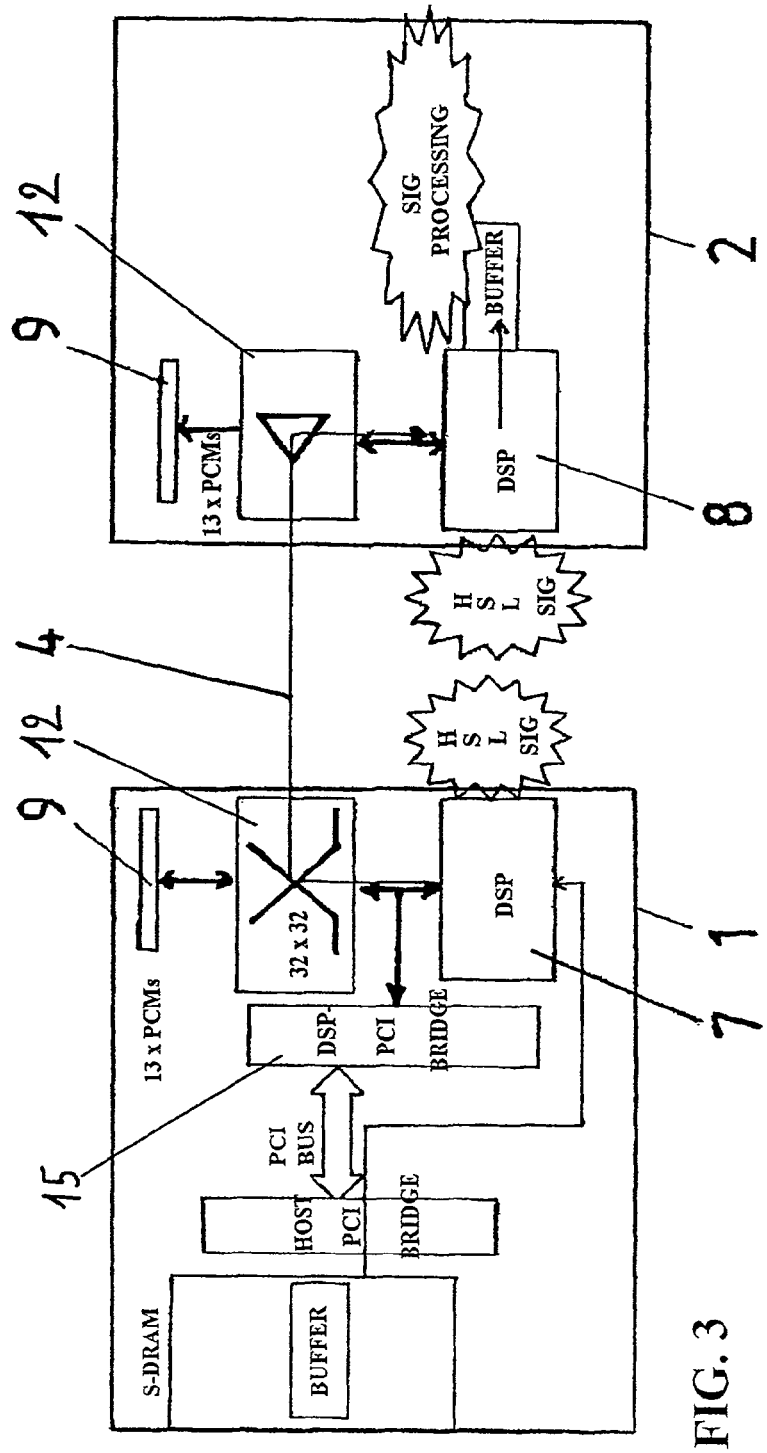
FIG. 3 is a simplified schematic representation in the form of a block diagram of the main components of the main cabinet and of an expansion cabinet connected with the latter.
FIG. 4 is a schematic diagram showing a possible structure of the high speed link.

FIG. 4 schematically illustrates the types of data or messages (and the corresponding channels) carried by the high speed link between the main cabinet 1 (master) and the expansion cabinet(s) (slave), namely synchronization and clock recovery, reset/download/control (maintenance), signaling and user data (PCM multiplex).

According to the invention, the control channel performs, in each expansion cabinet 2, all initialization and maintenance functions for said cabinet 2. Furthermore, the synchronization and the clock recovery in these cabinets 2 are performed automatically, as soon as the corresponding expansion cabinet 2 is connected with the main cabinet 1.

FIGS. 3, 5 and 6 of the drawings show, by way of a particular example, the main functional components integrated in the main cabinet 1 (FIG. 5) and in each of the expansion cabinets (FIG. 6), as well as their arrangement and connections.

The main cabinet 1 can comprise for example a control processing unit 6 (CPU) and two applicative processing units 6' (APU) all based on the same type of processor (for example ASPEN).

Nevertheless, the APU or APUs 6' can also be mounted in one or several of the expansion cabinet(s) 2, in the form of boards installed in adapted slots of said cabinet(s) 2.

The APU 6 structure and composition is similar to the main or host CPU 6 ones, as represented on FIG. 5, and the man skilled in the art can, for example, also take into consideration the description of such units as mentioned in European patent application No. 00440050.3 of Feb. 21, 2000 in the name of the present applicant.

It should also be noted that, while FIGS. 1 and 2 only show parallel linkages between main cabinet 1 and expansion cabinets 2, it is also possible to connect the expansion cabinets 2 in a serial way, with a cascade type connection, the end expansion cabinet 2 being connected to the expansion cabinet 2 linked with the main cabinet 1, through a slave connection (see FIG. 6).

Also, depending on the given circumstances, on the required services and on the needs of the different cabinets, only the main cabinet 1 may be connected to the PSTN and/or ISDN network or, as an alternative, several or all cabinets 1, 2 may be connected to said networks (FIG. 1).

Furthermore, when a local wireless communication system is used, comprising several base stations, each of the base stations can be connected to a different cabinet 1, 2, located in mutual distant places, in order to extend the area covered by said wireless system.

Figure 7:
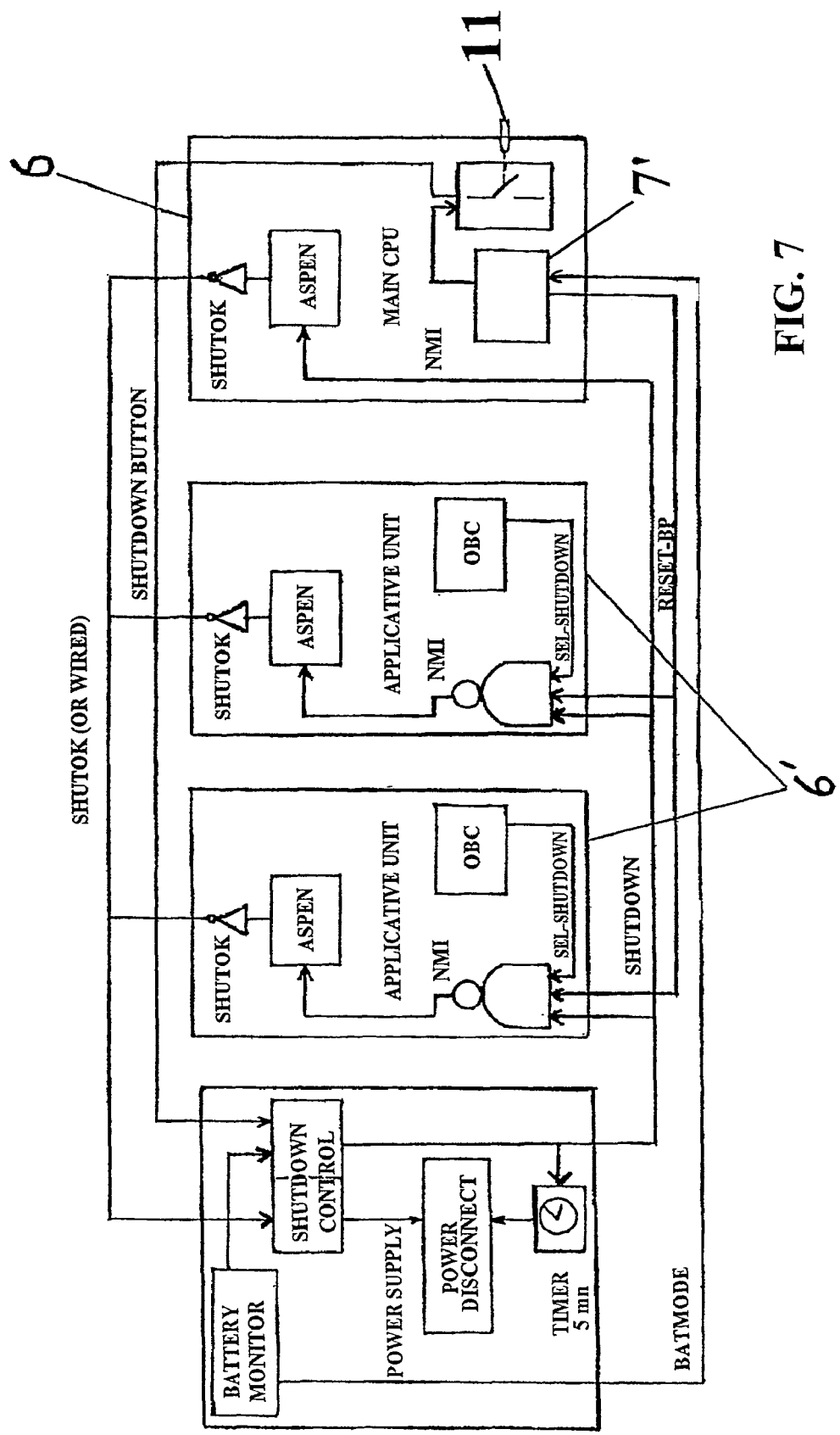
FIG. 7 is a schematic representation in the form of a functional block diagram of the system (CPU+two APU) shutdown chain, and, FIG. 8 is a schematic representation in the form of a functional block diagram of the system (CPU+one APU) reset chain.
Figure 8:
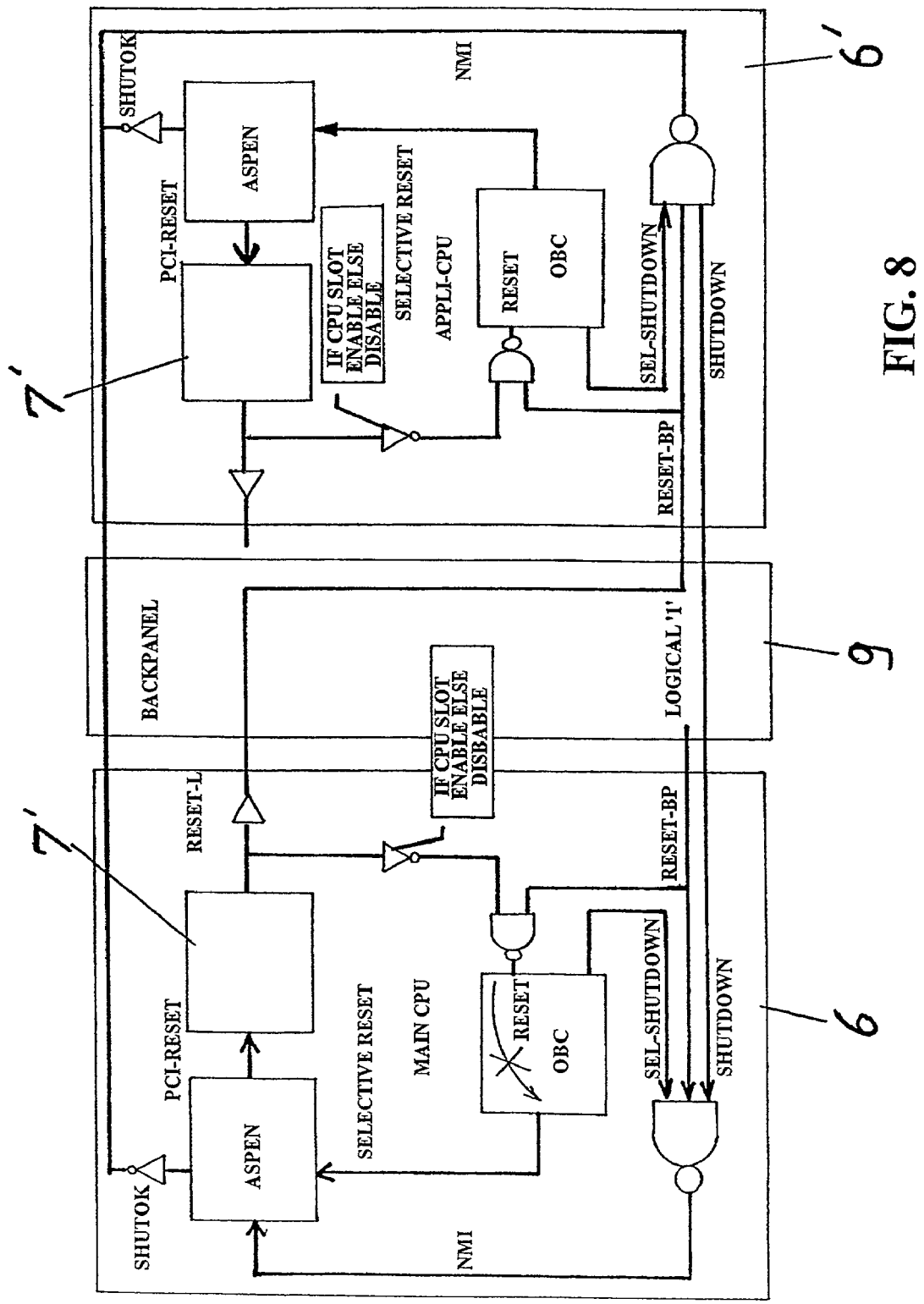

The main cabinet 1 also comprises a shutdown button or switch 11, associated with a corresponding shutdown chain (see FIG. 7) able to perform a selective shutdown function through an ASL (Asynchronous Serial Link) message for the applicative processing units 6'. A similar selective function can be provided for the "Reset" of these units 6' (see FIG. 8), both under the control of the OBC (On Board Controller).

The activation of the shutdown function is performed under user control or induced by the end of battery back-up and handled directly by the power supply. All processor units 6, 6' are directly connected to the shutdown signal issued from the power supply (triggering of a Non Maskable Interrupt procedure on CPU and APU boards—on APU boards the shutdown signal is OR wired with the backpanel reset). The power supply switches off when according positive answers have been received from all processor units 6, 6' or after a time out (for example five minutes) when a board is blocked. The shutdown switch or button 11 is also used to restart the whole system.

The ASICs (application specific integrated circuit) 7' and 8' of the main and expansion cabinets 1 and 2 have the same constitution and can mainly comprise, as shown on FIGS. 5 and 6, a switching unit 12, a DUART (Dual Universal Asynchronous Receiver Transmitter) unit 13, a PCM multiplex/demultiplex unit 14, a PCI/DSP bridge 15 and ADPCM (Adaptative Pulse Code Modulation) and HDLC (High-level Data Link Control) units 16.

Preferably, the backpanel support 9 for connection of all interface boards (extension and trunks) or applicative boards 6' is identical for all cabinets 1 and 2 (connection sites 10).

In order to be able to adapt the telecommunication system in a very flexible way to various configurations and various installation sizes, the cabinets 1, 2 can be of different sizes depending on their number of connection sites. Advantageously, there can be provided a basic standard sized cabinet (in terms of number of connection sites and in terms of physical size of the cabinet), and different evolutions of this basic cabinet (twice, three times, four times or more, the size of the said basic cabinet).

According to the invention, there is provided a modular expandable system based on a main cabinet and at least one expansion cabinet linked together, wherein a particular transmission link provides all necessary features to connect one or more further cabinets to a main one in a genuine "plug and phone" way. The resulting composite system is seen as a single system from the user point of view (features and performances).

The present invention uses an easy system capacity increase procedure by just adding expansion cabinets 2 via the transmission link 4. Each extension via the transmission link actually provides an expansion of the backpanel 9 of the main cabinet 1 to allow the connection of more interfaces for extensions and trunks (more connection sites). The expansion cabinets 2 can be located remotely from the main cabinet 1 and connected to the latter through a transmission link 4 comprising in an electrical cable (short distance) or an optical fiber cable (long distance).

It should be noted that the solution proposed by the present invention is also adapted for wireless base stations (DECT) expansion as, due to the synchronization and frame adjustment procedures, seamless handover from one cabinet to another one is possible.

The present invention is, of course, not limited to the preferred embodiment described and represented herein, changes can be made or equivalents used without departing from the scope of the invention.

The invention claimed is:

1. A modular expandable telecommunication system, including a private automatic branch exchange system (PABX), comprising a main or primary cabinet and at least one expansion or secondary cabinet, which are interconnected with each other in order to obtain an extended telecommunication system with increased connection possibilities for extensions and trunks, wherein the main cabinet and each of the expansion cabinets comprise a transmission interface unit allowing connection of said at least one expansion cabinet with said main cabinet via a single transmission link conveying voice/data channels and low level or local signaling for performing at least mutual synchronization and clock recovery for all interconnected cabinets, the main cabinet comprising a master clock device, a central processing unit (CPU) for running an application and a digital signal processor (DSP) for routing higher level messages issued by the CPU depending on the physical location of a destination cabinets
wherein each transmission interface unit comprises means providing synchronization with clock recovery and frame adjustment, a control channel of the corresponding expansion cabinet, remote resetting and downloading of software resident on said expansion cabinet, connecting means for short or long haul transmission and line coding and/or scrambling.

2. The modular expandable telecommunication system according to claim 1, wherein each transmission interface unit comprises an application specific integrated circuit (ASIC) associated with a corresponding DSP, the DSP of the main cabinet controlling the switching of all external connections of all cabinets.

3. The modular expandable telecommunication system according to claim 2, wherein each transmission interface unit is connected to a transmission link comprising a high speed link using PCM multiplex for voice/data transmission.

4. The modular expandable telecommunication system according to claim 1, wherein for each expansion cabinet, the control channel performs all initialization and maintenance functions for said cabinet and the synchronization and the clock recovery are automatically performed when said expansion cabinet is connected with the main cabinet.

5. The modular expandable telecommunication system according to claim 1, wherein the cabinets are of different sizes depending on their number of connection sites.

6. The modular expandable telecommunication system according to claim 1, wherein the control channel performs all initialization functions for an expansion cabinet.

7. The modular expandable telecommunication system according to claim 6, wherein synchronization and clock recovery are automatically performed when said expansion cabinet is connected with the main cabinet.

8. A modular expandable telecommunication system, comprising:
a first cabinet;
at least one second cabinet; and
a transmission interface unit allowing communication between the at least one second cabinet with the first cabinet via a single transmission link conveying voice or data channels and low level or local signaling for performing at least mutual synchronization and clock recovery, the first cabinet comprising a digital signal processor (DSP) for routing higher level messages issued by a central processing unit (CPU) of the first cabinet depending on a physical location of the at least one second cabinet;
wherein each transmission interface unit comprises means providing synchronization with clock recovery and frame adjustment, a control channel of the corresponding expansion cabinet, remote resetting and downloading of software resident on said expansion cabinet, connecting means for short or long haul transmission and line coding and/or scrambling.

9. The modular expandable telecommunication system according to claim 8, wherein the first cabinet includes a primary cabinet and the at least one second cabinet includes a secondary cabinet.

10. A modular expandable telecommunications system, comprising:
a primary cabinet; and
at least one secondary cabinet;
wherein the primary cabinet and the at least one secondary cabinet are interconnected with each other, wherein the primary cabinet and the at least one secondary cabinet comprises a transmission interface unit allowing connection of the at least one secondary cabinet to the primary cabinet via a single transmission link conveying voice/data channels and low level signaling for mutual synchronization and clock recovery for all interconnected cabinets, and the primary cabinet comprises a master clock device, a central processing unit (CPU) for running an application and a digital signal processor (DSP) for routing high level messages issued by the CPU that are dependent upon a physical location of the at least one secondary cabinet to which the high level message is routed;
wherein each transmission interface unit comprises means for providing synchronization with clock recovery and frame adjustment, a control channel of the corresponding secondary cabinet, remote resetting and downloading of software resident on said secondary cabinet, connecting means for short or long haul transmission and line coding and/or scrambling.

11. The modular expandable telecommunication system according to claim 10, wherein each transmission interface unit comprises an ASIC associated with a corresponding DSP, the DSP of the primary cabinet controlling the switching of all external connections of all cabinets.

12. The modular expandable telecommunication system according to claim 10, wherein each transmission interface unit is connected to a transmission link comprising a high speed link using PCM multiplex for voice/data transmission.

13. The modular expandable telecommunication system according to claim 10, wherein for each secondary cabinet, the control channel performs all initialization and maintenance functions for said secondary cabinet and synchronization and clock recovery are automatically performed when said secondary cabinet is connected with the primary cabinet.

14. The modular expandable telecommunication system according to claim 10, wherein the control channel performs all initialization functions for a secondary cabinet.

15. The modular expandable telecommunication system according to claim 10, wherein synchronization and clock recovery are automatically performed when said secondary cabinet is connected with the primary cabinet.

16. The modular expandable telecommunication system according to claim 10, wherein said secondary cabinet is remotely located.

* * * * *

UNITED STATES PATENT AND TRADEMARK OFFICE
CERTIFICATE OF CORRECTION

| | |
|---|---|
| PATENT NO. | : 7,843,971 B2 |
| APPLICATION NO. | : 09/968915 |
| DATED | : November 30, 2010 |
| INVENTOR(S) | : Penet |

It is certified that error appears in the above-identified patent and that said Letters Patent is hereby corrected as shown below:

Col. 5, line 19, please replace "cabinets" with --cabinet;--.

Signed and Sealed this
Fourteenth Day of June, 2011

David J. Kappos
*Director of the United States Patent and Trademark Office*